Nov. 28, 1944.   C. F. LEATHERS   2,363,536
WELDING MECHANISM
Filed April 24, 1942
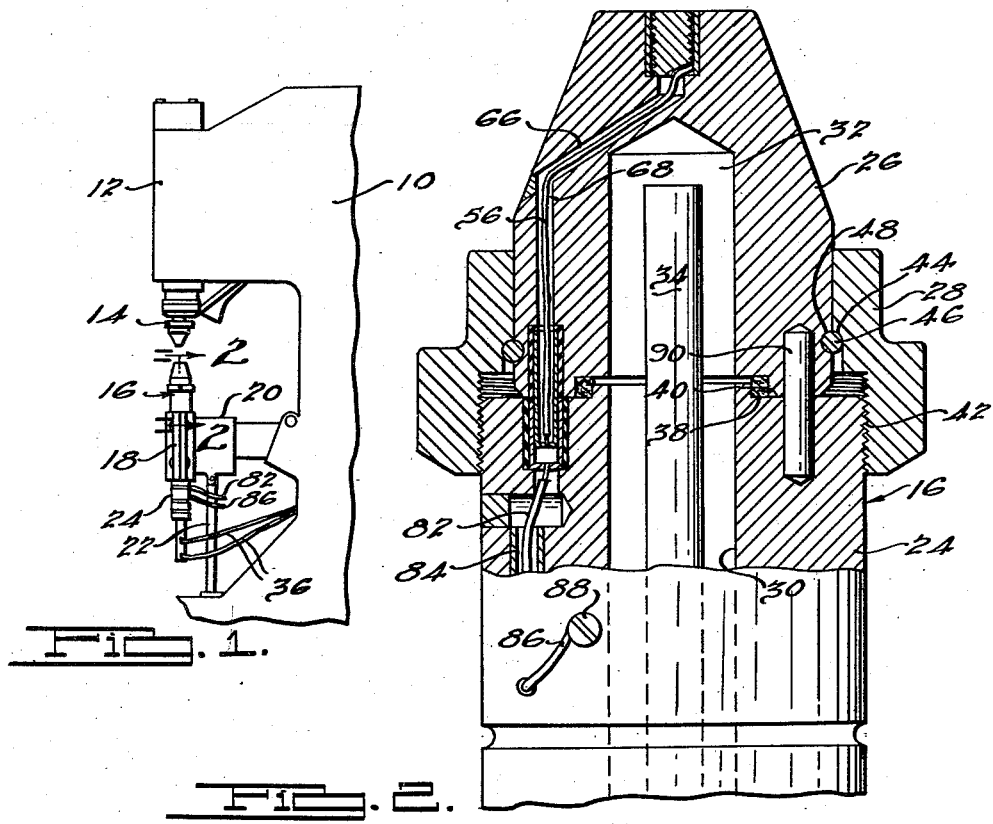
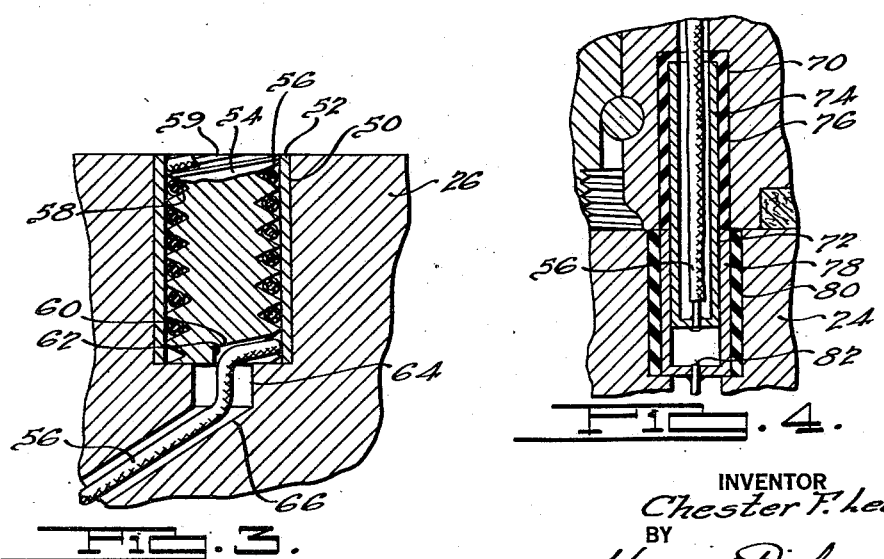
INVENTOR
Chester F. Leathers
BY
Harness, Dickey & Pierce.
ATTORNEYS.

Patented Nov. 28, 1944

2,363,536

UNITED STATES PATENT OFFICE 2,363,536

WELDING MECHANISM

Chester F. Leathers, Detroit, Mich., assignor to Progressive Welder Company, Detroit, Mich., a corporation of Michigan Application April 24, 1942, Serial No. 440,379

8 Claims. (Cl. 219—4)

The present invention relates to welding apparatus, and in particular is directed to improvements upon the electrode structures described and claimed in the copending application of the present applicant, Serial No. 442,463, filed May 11, 1942, as a continuation in part of application, Serial No. 415,015, filed October 15, 1941. The present application is a continuation in part of applicant's now abandoned but copending application Serial No. 429,999, filed February 9, 1942.

The principal objects of the present invention are to provide an electrode structure having exposed, upon the work engaging face thereof, a thermocouple element, and incorporating improved means for securing the thermocouple element within the body of the electrode; to provide such a construction wherein the thermocouple element comprises an insulated wire supported within a sheath or sleeve, which is fitted into a recess provided at the end of the electrode, and wherein the sleeve receives a threaded member upon which the wire is wound, the latter member and the end of the wire being exposed upon the end of the electrode; to provide such a structure embodying an improved releasable connection between the part of the thermocouple wire which is carried by the electrode tip and that part thereof which is carried by the support for the tip; and to provide an electrode construction embodying an improved structural relation between the electrode tip and the electrode holder.

With the above as well as other objects in view, which appear in the following description and in the appended claims, a preferred but illustrative embodiment of the invention is shown in the accompanying drawing, throughout the several views of which corresponding reference characters are used to designate corresponding parts and in which:

Figure 1 is a fragmentary view in side elevation of a welding machine embodying the invention;

Fig. 2 is an enlarged view in section, taken along the line 2—2 of Fig. 1;

Fig. 3 is a fragmentary enlarged view based on Fig. 2; and

Fig. 4 is an enlarged view based on Fig. 2.

It will be appreciated from a complete understanding of the present invention that the improvements thereof may be incorporated in a wide variety of different types of electrode structures intended for use in the practice of various welding processes. It is preferred to incorporate the invention in one or both of the electrodes of a spot welding machine, and by way of illustration, but not of limitation, the invention is herein shown as embodied in the lower or stationary electrode of a spot welding machine.

Referring particularly to Fig. 1, the illustrated spot welding machine comprises a usual frame structure 10, having a forwardly extending horn 12, which carries a movable electrode 14. Any suitable ram mechanism may be incorporated in the horn 12 to normally bias the electrode 14 to its illustrated upper position, and to cause the latter to move to a lower or work engaging position. These means, as will be understood, may be arranged to apply any desired degree of pressure between the electrode 14 and the companion stationary electrode 16, and this pressure may be either uniform or variable, and may be either of continuous or interrupted character. The lower electrode 16 is solidly clamped by means of a clamp 18 to a bus bar 20, which is supported in and extends forwardly from the frame of the machine. If desired, a suitable column, such as 22, may be provided to afford additional support to the lower electrode 16, it being understood that considerable pressures are applied to the electrode.

Referring particularly to Figs. 2, 3 and 4, the lower electrode 16 comprises a holder 24, which, as aforesaid, is adjustably received in the clamp 18, a replaceable tip 26, and a connecting collar 28. The holder 24 and the tip 26 are provided with registering bore portions 30 and 32, which, with the pipe 34, provide a circuit through which coolant may be introduced to and exhausted from the electrode 16 through the illustrative coolant lines 36. In the broader aspects of the invention, any suitable coolant may be utilized, but in order to protect the hereinafter described thermocouple elements, it is preferred to circulate a refrigerated coolant in accordance with the invention described and claimed in the copending application of the present applicant and Walter G. Moehlenpah, Serial No. 446,176, filed June 8, 1942, as a continuation in part of their application, Serial No. 415,184, filed October 16, 1941.

The upper surface 38 of the holder 24 and the lower surface 40 of the tip 26 are machined planar surfaces and are maintained in clamped relation to each other by means of the collar 28. It will be understood that the welding circuit includes the holder 24, as well as the tip 26, and that the just-mentioned engagement consequently is required to present a negligible resistance to the flow of welding current. The collar 28 is provided with internal threads 42, which mate with corresponding external threads provided at the upper end of the holder 24, and is also provided with a shoulder 44, which abuts a radially outwardly extending projection 46 provided on the tip 26. The projection 46 is illustrated as being defined by a ring-like member which encircles the tip 26 and is seated in an annular groove 48 provided therein. As will be understood, as the collar 28 is threaded downwardly onto the holder 24, the engagement between the shoulder 44 and the projection 46 draws the co-engaging surfaces of the tip and the holder into tight engagement with each other. This arrangement for securing the replaceable tip 26 to the holder 24 is very advantageous in electrode structures generally, since the flat engaging surfaces 38 and 40 are readily able to withstand the very substantial pressures to which the electrodes are subjected in practice, and at the same time the provision of the removable collar 28 enables the tip 26 to be secured to the holder 24 in any rotative position. This latter feature is of particular advantage in connection with electrode structures wherein the tip embodies an offset portion.

In further accordance with the present invention, the end of the tip 26 is counterbored to provide a cylindrical recess 50, which receives the thermocouple assembly comprising a protective sleeve 52, a threaded plug 54, and an insulated thermocouple wire 56. The plug 54 is provided with relatively deeply cut external threads 58, and the wire 56 is wound into the interdental spaces of this thread. With this relation, the extreme end 59 of the wire 56 is flush with, and directly exposed upon, the work engaging face of the tip 26. As the work engaging surface of the tip wears away, the plug 54 and the wire 56 correspondingly wear away. Until such a time, however, as the tip has been worn away to the full depth of the plug 54, the wire 56 continuously presents an exposed end 59 at the face of the electrode.

When the work to be welded is received between the electrodes 14 and 16, and the electrode 14 is actuated downwardly so as to apply a pressure to the work, a corresponding pressure is, of course, developed between the work and the lower electrode 16. The end 59 of the thermocouple wire, being exposed upon the face of the electrode, is consequently directly engaged by the work and is forced, by the aforementioned pressure, into electrical contact with both the surface of the work and the surface of the electrode. As is discussed in more detail in the aforesaid copending application Serial No. 442,463, the wire 59 may be formed of a material which is dissimilar to the electrode so that with the electrode it forms a thermocouple. Alternatively, the wire 59, though not effective to form a satisfactory thermocouple with the electrode, may be dissimilar to the work, and consequently be effective to form a thermocouple with the work. In other cases, such, for example, as those in which the wire 59 is formed of one of the alloys commonly known as "constantan," the electrode is formed of copper or one of the usual alloys thereof suited for electrode purposes, and the work is composed principally of iron, the wire 59 is effective to form a thermocouple both with the electrode and with the work. Thus, in operation, one thermal E. M. F. is developed at the junction between the wire 59 and the electrode, and another thermal E. M. F. is developed at the junction between the wire 59 and the work. In such cases, it is usually found, however, that the electrical junction between the wire 59 and the electrode is more perfect than the electrical junction between the wire 59 and the work, so that the former E. M. F. predominates and the temperature at which the apparatus responds is the temperature at the face of the electrode.

The plug 54 is press fitted into the previously mentioned sleeve 52, which in turn is press fitted into the previously mentioned recess in the tip 26, and it will be understood that the provision of the sleeve 52 protects the wire 56 during the insertion of the plug 54 and the sleeve 52 into the recess 50. A preferred method of assembly comprises first winding the wire 56 upon the plug 54, inserting these elements in the sleeve 52, and thereafter inserting these elements into the recess 50. At its inner end, the plug 54 is provided with a lateral passage 60, which communicates with an axial passage 62, through which the wire 56 is passed. The axial bore 62 registers with a somewhat larger counterbored pocket 64 in the tip 26, the proportioning of which is large enough to insure that the wire 56 is not cramped when the thermocouple assembly is introduced into the tip.

The wire 56 passes through a laterally extending bore 66 formed in the tip 26, which registers with a vertically extending passage 68. The passage 68 opens into an enlarged pocket 70 formed in the lower end of the tip 26. The end 72 of the wire 56 is soldered or otherwise permanently secured within a jack element 74, which is tightly fitted into the pocket 70, but is insulated from the tip 26 by means of an insulated sleeve 76. The jack element 74, in the assembled position of the tip 26 and the holder 24, is received within a companion jack element 78. The element 78 is tightly fitted in, but is insulated from, the holder 24 by means of an insulating sleeve 80. Also, the jack element 78 is permanently connected as by soldering to the cooperating thermocouple wire portion 82, which latter wire portion extends downwardly through a bore 84 provided in the holder 24. The bore 84 is provided near the lower end of the holder 24 with a side outlet, through which the wire 82 may be projected. The other thermocouple lead 86 also extends upwardly through the bore 84 and is electrically connected to the holder 24 by means of a screw 88. It will be understood that in those cases where the thermal E. M. F. to be measured is developed between the work and the wire 59, the work is connected to the external circuit through the electrode 16 and the lead 86, in view of the fact that the face of the electrode directly engages and, consequently, is in electrical connection with the work.

In assembling the structure, it is preferred to initially provide the lower end of the wire 56 with extra length, so that when the wire 56 is threaded through the passages 66 and 68, preparatory to the insertion of the plug 54 into the tip 26, the free end of the wire 56 can be threaded through the jack element 74 before the latter is fitted into the tip 26. With the parts thus threaded together, the element 74 may be fitted into the tip 26 and thereafter the wire 56 may be soldered to the element 74. Similar comments, of course, apply to the preferred method of first connecting the wire 82 to the jack element 78 and thereafter fitting the latter into the holder 24.

It will be understood from the foregoing that when the thermocouple elements associated with the tip 26 are completely assembled therein, the jack element 74 projects downwardly from the underside of the tip 26. When the tip 26 is fitted onto the holder 25, the jack element 74 is received in the cooperating jack element 78. The application of the collar 28 applies some rotative force to the tip 26, as will be understood, and in order to prevent this rotative force from damaging the thermocouple elements, it is preferred to provide one or more aligning dowels, such as 90.

Although only a single specific embodiment of the invention has been described in detail, it will be appreciated that various modifications in the form, number and arrangement of parts may be made without departing from the spirit and scope of the invention.

What is claimed is:

1. In an electrode, the combination of a body member having at one end a substantially planar surface, a tip having a work engaging portion and having at one end a generally planar surface engageable with said first mentioned surface, a connecting collar threadably associated with one of said members for applying a pressure between said surfaces in a direction substantially normal thereto, a thermoelectric element having a jack portion carried by one of said members and having a plug portion carried by the other member, said plug and jack portions being electrically engaged when said surfaces are drawn together.

2. In an electrode, the combination of a body member having at one end a substantially planar surface, a tip having a work engaging portion and having at one end a generally planar surface engageable with said first mentioned surface, a connecting collar threadably associated with one of said members for applying a pressure between said surfaces in a direction substantially normal thereto, a thermocouple element carried by said electrode and having separable plug and jack portions, one of said portions being recessed into but projecting from one of said surfaces and the other portion being recessed into the other surface, said plug and jack being electrically connected when said surfaces are drawn together.

3. In an electrode, the combination of a thermocouple element, a tip having a work engaging face and having a recess in said face, a plug received in said recess and forming a support for said thermocouple element, and a sleeve interposed between the wall of said recess and said plug and acting to support the plug and element relative to the tip.

4. In a thermoelectric device, the combination of a plug element having a thermoelectric element wound thereon, a sleeve surrounding said elements and serving to hold said thermoelectric element in place on said plug element, and an electrode having a work engaging face provided with a recess to receive said sleeve and said elements, said sleeve acting to support said elements within said recess.

5. In an electrode assembly, the combination of a conductive supporting body having a tip engaging face, a conductive tip having a work engaging surface and a body engaging face, said assembly including thermally actuated means, said means including a first element carried by said tip, a second element carried by the body, said assembly including means enabling said body and tip to be releasably secured together so as to apply a pressure between the said faces thereof, said elements having portions which are conductively engaged with each other when the said body and tip are secured together.

6. In an electrode assembly, the combination of a conductive supporting body having a tip engaging face, a conductive tip having a work engaging surface and a body engaging face, said assembly including thermally actuated means, said means including a first element carried by said tip, a second element carried by the body, and releasable coupling means for securing the body and tip together so as to apply a pressure between the said faces thereof, said elements having portions which are conductively engaged with each other when the said body and tip are secured together.

7. The structure of claim 5 wherein the said elements are received respectively in bores provided therefor in the said body and tip and which are brought into registry with each other when the said body and tip are secured together.

8. The structure of claim 5 wherein the said elements are wires which when so engaged with each other are operative to form an element of a thermocouple.

CHESTER F. LEATHERS.